June 19, 1923.
C. C. SMITH
1,459,268
DIRIGIBLE HEADLIGHT
Filed March 21, 1921
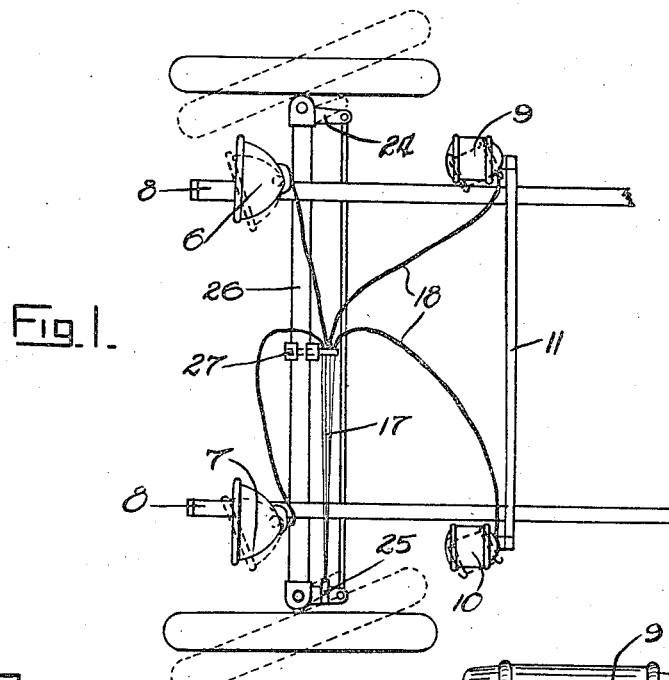
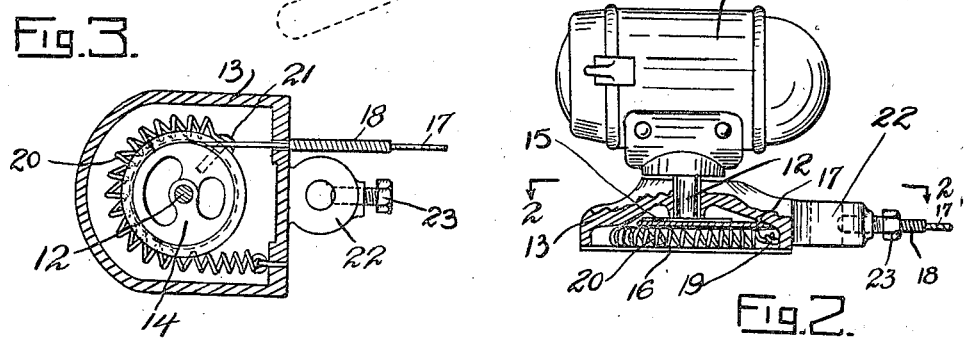
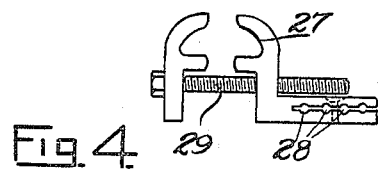
Inventor -
Cecil Charles Smith,
By B. Singer, Atty Patented June 19, 1923.

1,459,268

UNITED STATES PATENT OFFICE.

CECIL CHARLES SMITH, OF SYDNEY, NEW SOUTH WALES, AUSTRALIA.

DIRIGIBLE HEADLIGHT.

Application filed March 21, 1921. Serial No. 454,187.

(GRANTED UNDER THE PROVISIONS OF THE ACT OF MARCH 3, 1921, 41 STAT. L., 1313.)

*To all whom it may concern:*

Be it known that I, CECIL CHARLES SMITH, a subject of the King of Great Britain, residing at "Chelmsford," Reginald Street, Watersleigh, Sydney, in the State of New South Wales, Commonwealth of Australia, have invented certain new and useful Improvements in Dirigible Headlights (for which I have filed an application in Australia, March 18, 1920, No. 14,806, and New Zealand, December 16, 1920, No. 45,089), of which the following is a specification.

This invention relates to improvements in automatic track following lights for self-propelled vehicles provided with a steerable front axle.

The present invention has been devised to enable the lights to be placed on the front of the chassis (and) or on the dashboard, wind-screen supports, or other convenient position. If desired, one or all the lights may be automatically operated.

I will now refer to the accompanying sheet of drawings in which,

Figure 1 is a partial plan of a vehicle frame provided with lamps adapted to be automatically partially rotated corresponding to the inclination of the front wheels.

Figure 2 is an elevation partly in section of a lamp and its operating mechanism.

Figure 3 is a section on the line 2—2, Figure 2, and

Figure 4, an elevation of the preferred form of clamp for the outer member or members of the Bowden wire or wires.

The same numerals indicate the same or corresponding parts.

6 and 7 represent the lamps on the chassis 8, and 9 and 10 the side or spot lights on the windscreen 11. Each lamp is mounted rigidly on a spindle 12 to which is secured, within a casing 13, a wheel 14 provided with a circumferential groove 15 and a similar groove 16. Instead of a wheel I may have a quadrant or partial wheel. In the groove 15 is attached one end of a Bowden inner member 17 having its outer member 18 abutting outside the casing 13. The casing 13 has secured thereto at 19 one end of a spring 20 which takes in the groove 16 of the wheel 14 to which it is secured at 21. The casing 13 has integral with it the bracket 22 secured by a bolt 23 or like fastening to the chassis 8 or to the windscreen 11 or other convenient position. On one of the steering arms 24 is a clip 25 by which is attached the end or ends of the Bowden wires 17 and on the front axle 26 is mounted a suitable clamp 27 provided with holes 28 in which are held the ends of the outer Bowden members 18. This clamp may vary according to the section of the axle and has a suitable fastening such as the screw 29.

In operation, when the steering wheel is moved to turn the front road wheels in the usual manner, the steering arm 24 to which the wires 17 are secured effects a pull on said wires causing partial rotation of the respective wheels 14 and the spindles 12 thereon thereby carrying the corresponding lamps to the same angle as the front road wheels, such partial rotation being controlled by the tension springs 20 and thereby avoiding any vibration of the lamps and flicker of the lights. When the steering arm is moved to cause the vehicle to travel with its four wheels in alignment the lamps are simultaneously returned to the straight or normal position.

It is obvious that one or several of the lamps may be coupled by the Bowden wire or wires to the steering arm. It is also clear that the lamps on one side may be operated by the steering arm on the opposite side in which case the springs 20 and Bowden wires would be oppositely secured to their respective wheels and casings thereof.

I am aware that it has previously been proposed to turn vehicle lamps by Bowden wires manually operated.

I claim:—

In a dirigible headlight, a casing having means to attach the same to a member of an automobile, a lamp-carrying shaft mounted in the said casing for rotation and provided with a pulley, a Bowden wire having its inner member extended through an opening in the casing and attached at one end to said pulley, the outer member of said Bowden wire near said end, bearing against said casing, means to attach the opposite end of the inner member of the Bowden wire to a steering arm, and a clamp for attachment to a front axle and forming a guide for the inner member of the Bowden wire, the outer member of the Bowden wire bearing against said clamp, and a spring attached to the pulley and to the casing to turn the pulley and shaft in one direction.

In testimony whereof I have hereunto set my hand in presence of two subscribing witnesses.

CECIL CHARLES SMITH.

Witnesses:
CHARLES E. GRAHAM,
HERBERT G. BRIDGEMAN.